UNITED STATES PATENT OFFICE.

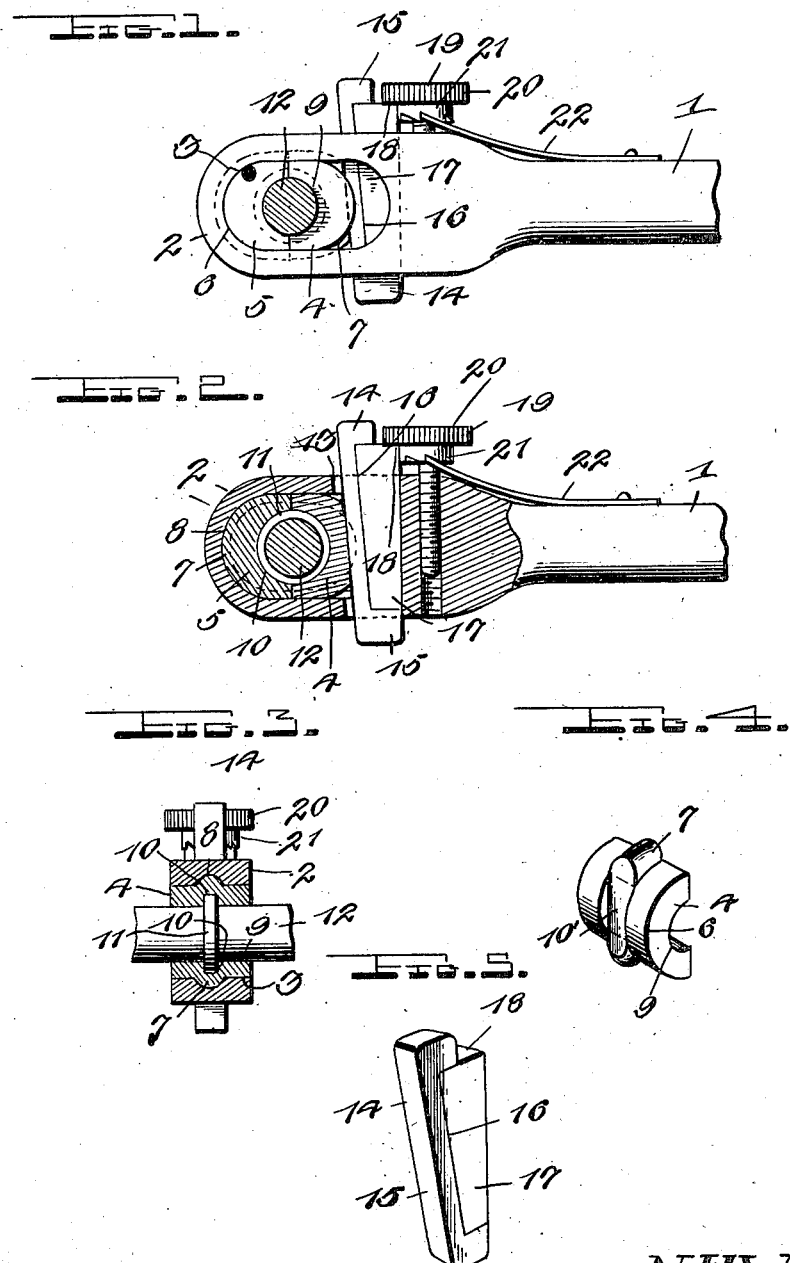

NEWTON H. WILLIAMSON, OF GREENFIELD, TENNESSEE, ASSIGNOR OF ONE-FOURTH TO JOHN J. GALEY AND ONE-FOURTH TO JAMES C. CAUDLE, OF ATWOOD, TENNESSEE.

PITMAN-CUFF.

1,034,553.  Specification of Letters Patent.  Patented Aug. 6, 1912.

Application filed March 25, 1912. Serial No. 686,048.

*To all whom it may concern:*

Be it known that I, NEWTON H. WILLIAMSON, a citizen of the United States, residing at Greenfield, in the county of Weakley and State of Tennessee, have invented certain new and useful Improvements in Pitman-Cuffs, of which the following is a specification, reference being had to the accompanying drawings.

This invention relates to new and useful improvements in pitman cuffs and more particularly to a sectional bearing therefor, the object of the invention being to provide a detachable connection between the pitman rod and the element to be operated thereby.

Another object of the invention is to provide a device of this character which will possess advantages in points of efficiency and durability, is inexpensive of manufacture and at the same time is simple in construction and operation.

With the above and other objects in view the invention consists in the novel features and in the combination and arrangement of parts hereinafter more fully described, pointed out in the claim and shown in the accompanying drawings, in which, Figure 1 is a side elevation of a pitman cuff constructed in accordance with my invention; Fig. 2 is a longitudinal sectional view; Fig. 3 is a transverse sectional view; Fig. 4 is a detail perspective view of one of the bearing members; and Fig. 5 is a detail perspective view of the wedge member.

Referring more particularly to the drawings, 1 indicates a pitman rod having an elongated head 2 formed on one end thereof, which is provided with a similarly shaped slot 3. Movably disposed in the slot 3 are the bearing members 4 and 5, each bearing member being provided with an outer curved surface 6 adapted to fit the circular ends of the slot 3. Each of the bearing members is provided on its outer surface with the centrally arranged rib 7 adapted to fit into the groove 8 formed in the walls of the slot 3 to prevent lateral movement on the bearing members.

The inner faces of the bearing members are provided with semi-circular recesses 9 having centrally arranged grooves 10 formed therein adapted to receive a circular rib 11 formed on the end of the shaft 12, said shaft being connected with the element to be operated by the pitman rod. An elongated opening 13 is formed in one side of the cuff, arranged at the inner end of the slot 3 and adapted to communicate with a similarly shaped opening in the other side of the cuff. Disposed in these openings is the wedge member 14 which comprises a bar 15 having one of its longitudinal edges cut away to form the recess 16. Arranged in the recess is the wedge shaped block 17 having its enlarged end projecting outwardly to form a shoulder 18. A set screw 19 is arranged at the inner end of the cuff and adjacent the opening 13, said set screw being provided with an enlarged head 20 adapted to engage with the shoulder 18 when the set screw is screwed down to force the wedge member downwardly, which in turn will force the bearing members into clamping engagement with the end of the shaft 12. The set screw 19 is provided with a ratchet 21 arranged beneath the head 20 adapted to be engaged by the spring pawl 22 to prevent any backward movement of the set screw.

In assembling the bearing members 4 and 5 they are first inserted within the slot 2, with the bearing recess of each of the members facing one of the opposed walls of the slot, the bearing members are then turned so that the rib 7 engages in the groove 8 to prevent lateral movement of the bearing member.

While I have shown and described the wedge member 14 formed in two pieces it will be fully understood that this member may be made in a single piece if desired without departing from the scope of the invention. The outer face of the bearing member 4 is provided with a recess 10' which forms a flat surface against which the wedge member 14 engages when forced downwardly by the set screw 19.

From the foregoing description taken in connection with the drawings it will be readily apparent that by the use of my improved pitman cuff the pitman rod may be quickly attached to or detached from the element to be operated.

While I have shown and described the preferred form of my invention it will be obvious that various changes in the details of construction and in the proportions may be resorted to for successfully carrying my invention into practice without sacrificing any of the novel features or departing from the scope thereof.

What I claim is:—

In combination with a shaft having an annular rib formed thereon at one end, of a pitman rod provided with an elongated head having a similar shaped slot formed therein, the inner walls of said slot being provided with centrally arranged semicircular grooves, bearing members movably arranged in said slot, said bearing members having semicircular ribs formed on the outer surface of said bearing members and adapted to be arranged within the grooves, the inner faces of said bearing members being provided with semicircular recesses, said bearing members being provided with grooves centrally arranged within said recesses and adapted to receive the rib formed on the shaft, said head being provided on one side with an opening arranged at the inner end of the slot, said head being further provided at the other side with a small opening communicating with the first opening, a wedge member movably disposed within said openings and adapted to engage the outer surface of one of said bearing members, said wedge comprising a bar having a recess formed in one of its longitudinal edges, a tapering block disposed within said recess and having its large end projecting outwardly beyond the edge of the bar to form a shoulder, a set screw carried by the pitman rod and adapted to engage with said shoulder to force the bearing members into clamping engagement with the end of the shaft which is to be operated by the pitman rod, and a spring pawl carried by the pitman rod and adapted to engage with the set screw to prevent backward movement thereof so that the wedge member will securely hold the bearing member into clamping engagement with the end of the shaft.

In testimony whereof I hereunto affix my signature in the presence of two witnesses.

NEWTON H. WILLIAMSON.

Witnesses:
W. A. BARTON,
Mc. A. CAUDLE.